Figure 1:
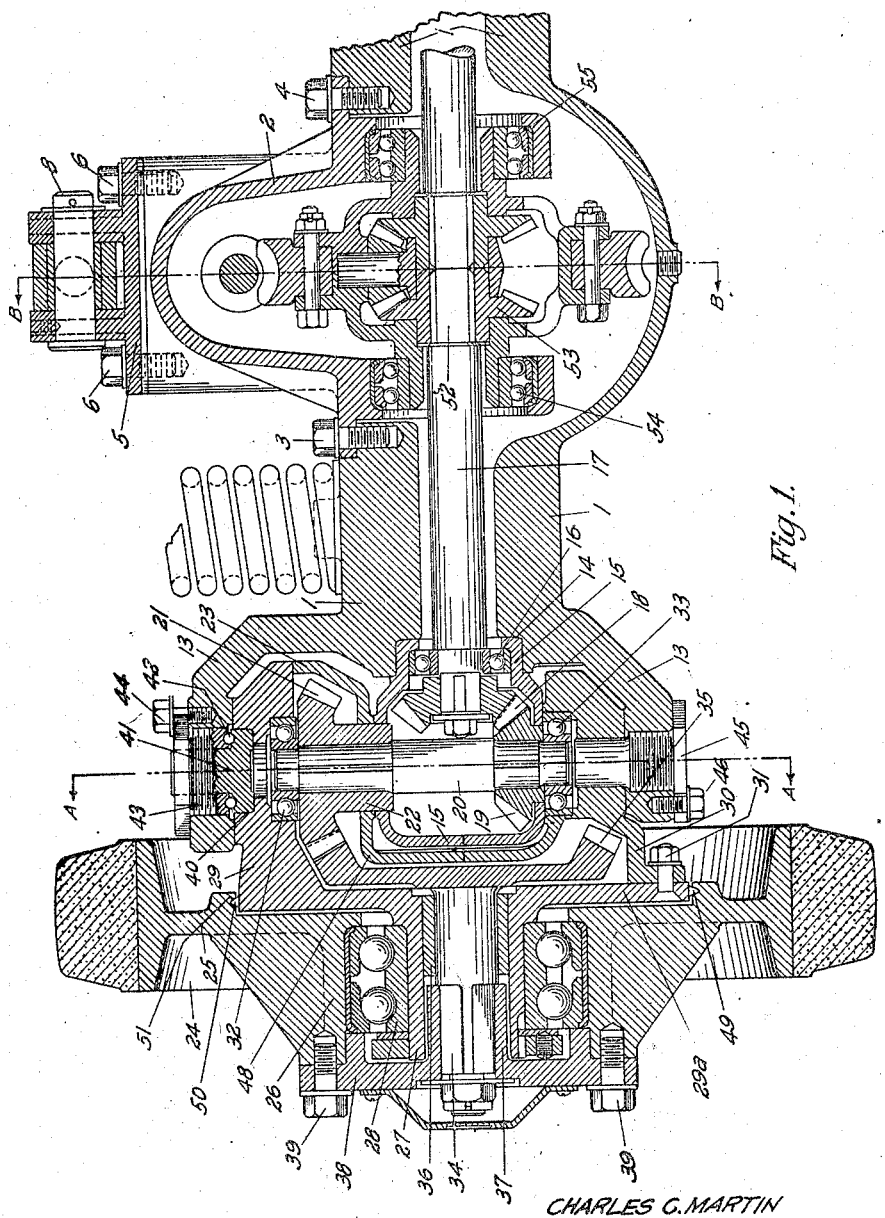

CHARLES C. MARTIN
JAMES H. COTTON INVENTORS

C. C. MARTIN AND J. H. COTTON.
AUTOMOBILE VEHICLE.
APPLICATION FILED MAR. 8, 1919.

1,364,398.

Patented Jan. 4, 1921.
5 SHEETS—SHEET 3.

CHARLES C. MARTIN  
JAMES H. COTTON  INVENTORS

BY

*[signature]* ATTORNEY

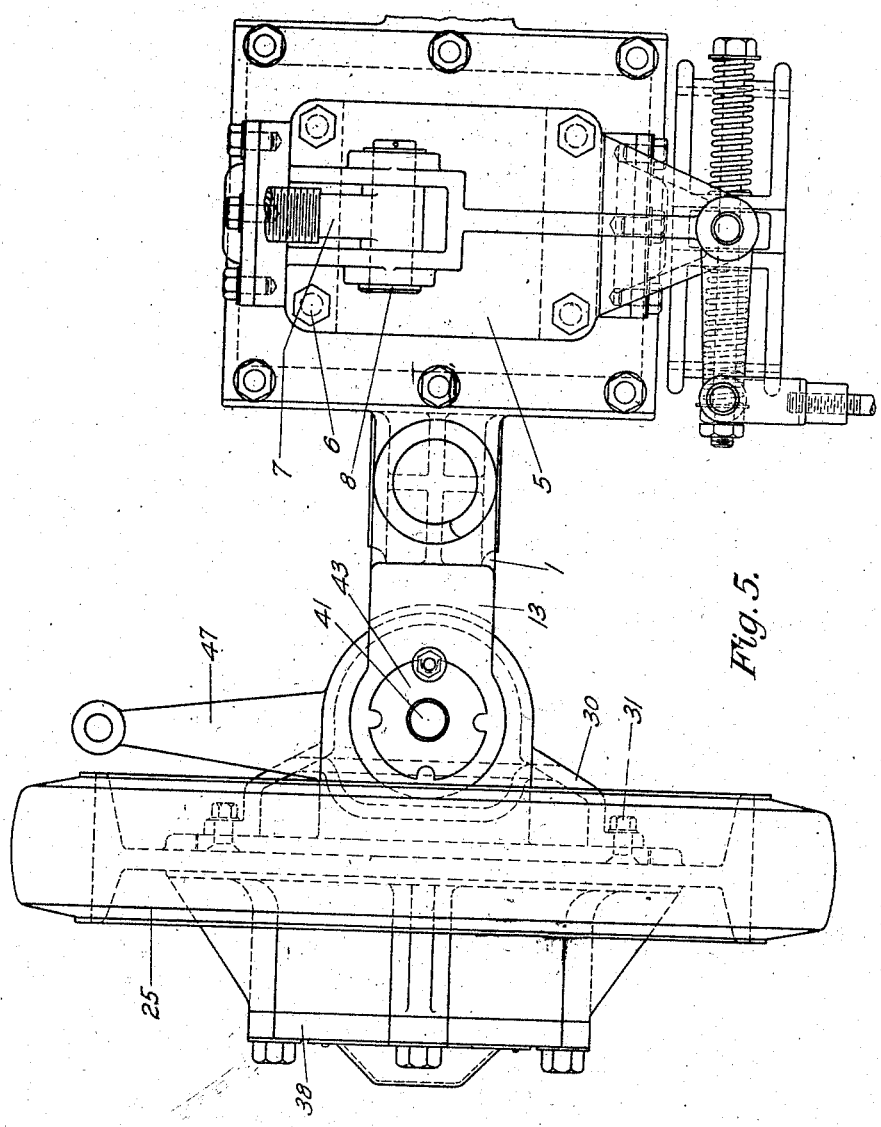

UNITED STATES PATENT OFFICE.

CHARLES C. MARTIN AND JAMES H. COTTON, OF COLUMBUS, OHIO, ASSIGNORS TO THE KILBOURNE AND JACOBS MANUFACTURING COMPANY, OF COLUMBUS, OHIO, A CORPORATION OF OHIO.

AUTOMOBILE VEHICLE.

1,364,398.

Specification of Letters Patent.

Patented Jan. 4, 1921.

Application filed March 8, 1919. Serial No. 281,510.

*To all whom it may concern:*

Be it known that we, CHARLES C. MARTIN and JAMES H. COTTON, citizens of the United States, residing at Columbus, in the county of Franklin and State of Ohio, have invented certain new and useful Improvements in Automobile Vehicles, of which the following is a specification.

This invention relates to improvements in automobile vehicles in which the power is applied to all of the wheels and the steering takes place on all the wheels also. Each wheel is swiveled to the axle housing upon which it is mounted in such manner as to be readily removable with its driving gears and axle shaft, thereby also permitting the removal of the differential construction intact. The axle housing is integral and continuous from wheel to wheel, and the differential casing is arranged to be set into the axle housing and secured therein in such manner as to be readily loosened and lifted out entire for repairs or for access to the axle housing. The axle housing at its ends is formed into large jaws to receive the load bearing axle which is also provided with unusually large jaw members for engaging the jaws on the axle housing to which it is swiveled by appropriate swivel pins. The axle construction is of the full floating type and the wheel is formed with a spacious hub into which is mounted the load bearing axle, which receives the wheel driving axle; the latter is geared to the driving gear mechanism actuated by the axle shaft.

The features of this invention are the relatively small number of parts, the exceedingly strong construction provided, the readiness with which the wheel and its associated parts may be removed from the axle housing, the integral axle housing continuous from wheel to wheel, the mounting of the differential in a separate casing and mounting the same upon and securing the same to the axle housing to be capable of removal without disturbance of the parts of the axle housing, and the connection of the torsion rod with the top housing on the differential casing, whereby the movement of the axle shaft is rendered more steady and the stress due to the wheel's coming into contact with road obstacles or due to irregularities in the surface of the roadway is relieved in greater measure than with present constructions.

Simplicity and strength and ease of assembling and disassembling the parts are cardinal features of this invention which will appear in detail as the description proceeds.

Figure 2:
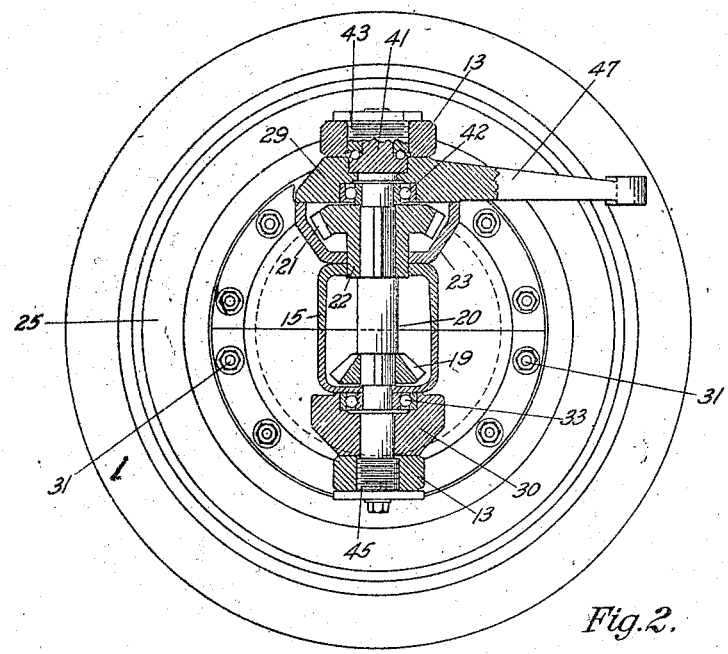
Figure 6:
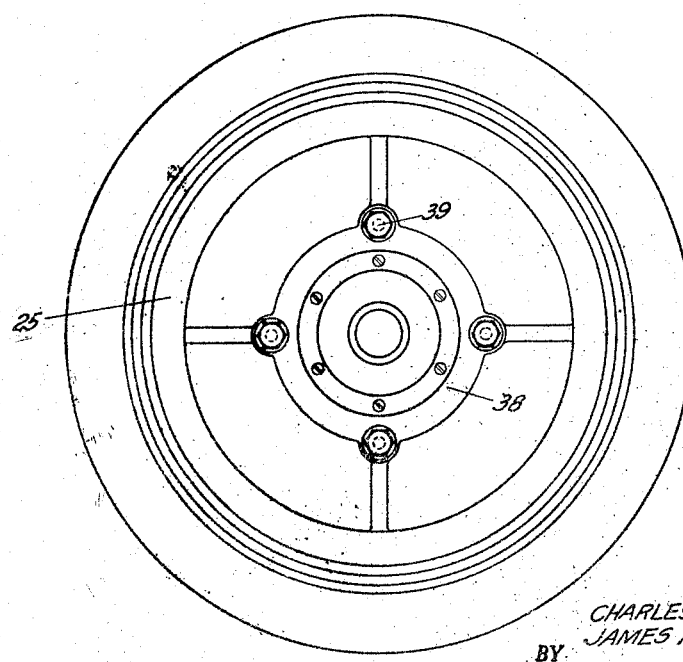
Figure 3:
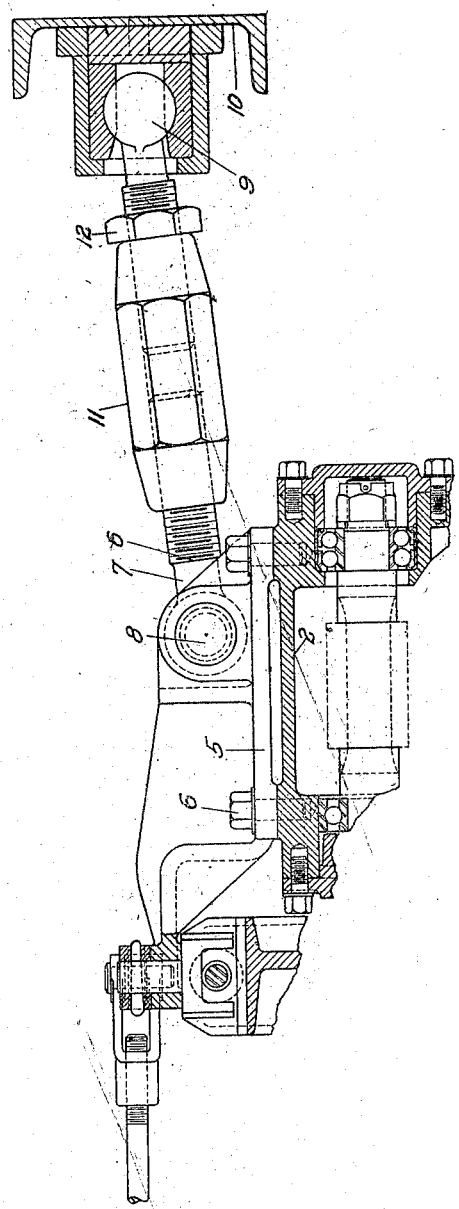
Figure 4:
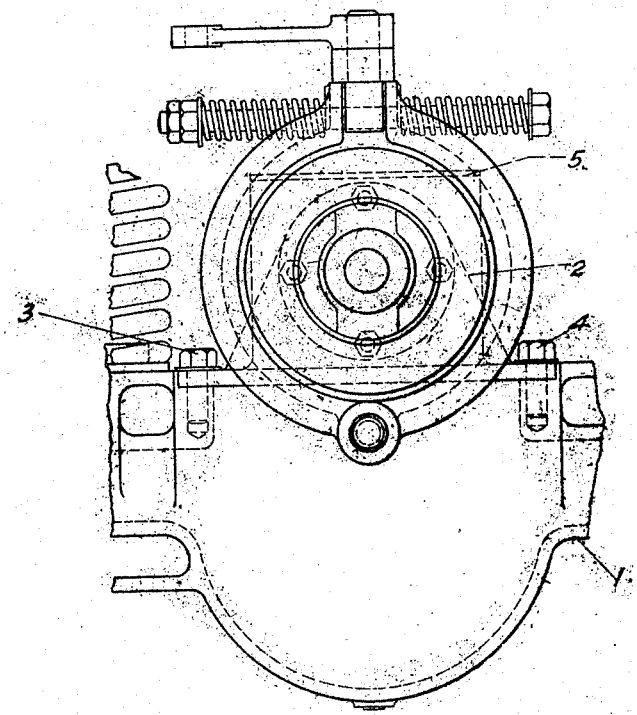

Referring to the drawings which are hereto attached and are hereby made a part of this specification Figure 1 is a vertical transverse section through the wheel and swivel joint and includes a longitudinal vertical section through the associated axle housing and shaft and the differential casing and housing thereon. Fig. 2 is an inside elevation of the wheel with the swivel and driving mechanism in section, taken along the line A—A of Fig. 1; Fig. 3 is a section along the line B—B of Fig. 1 to illustrate the construction at the top to show the connection of the torsion rod. It will be noted that the axle construction shown herein is that of a front axle, and in Fig. 3 the forward part of the vehicle frame is at the right, the worm gear drive for the differential and the bearings therefor also appearing in this view. Fig. 4 is an elevation of the center portion of the axle housing showing the mounting thereon of the casing for the driving connections between the driving shaft and the differential; Fig. 5 is a top plan view of the wheel and axle and differential and associated parts; Fig. 6 is an elevation of the wheel from the outside of the vehicle.

In the drawings 1 is the axle housing integral and continuous from side to side of the vehicle; 2 is the housing for the differential casing in which the differential gearing appears in Fig. 1, the housing being secured to the axle housing at 3 and 4, from which it can readily be detached on occasion; carried on the housing for the differential casing at the top thereof is a plate member 5 secured thereto by the screws 6, 6, on which member is mounted the torsion rod 7 by means of the pin 8, the rod being mounted at its other end at 9 in the end frame member 10. This rod has pivotal connections at its ends and in the form here shown is in two parts connected by the turnbuckle 11 fixed in the desired position by the lock nut 12. This manner of mounting the torsion rod on the top housing of the differential tends to overcome to an extent not possible with other mountings the pinching or binding effect produced between the axle and its housing by the action of the spring supported load thereon, and also by the contact of a wheel with obstructions or by the irregularities of the surface of the roadway.

The axle housing 1 expands into the wire jaws 13, 13 to accommodate the gears and swivel joint construction and to coöperate with the load bearing axle mounted into the wheel. At 14 the housing 1 is reamed to seat the housing 15 in which are mounted bearings 16 for the axle shaft 17, which carries the pinion 18 engaging the pinion 19 carried on the pinion shaft 20, which latter carries at its upper end the pinion 21 provided with the long sleeve or hub 22 for reinforcing the construction. The pinions 18 and 19 and the end of the hub of pinion 21 lie within the housing 15, a very compact formation permitting of ample lubrication without wastage. A similar housing 23 for the pinion 21 is seen in Fig. 2.

The wheel 24 has the web 25 expanding into the hub member 26 into which is mounted the load bearing axle 27 which supports the wheel 24 on the bearings 28; the load bearing axle 27 expands into the projecting member 29 at the top to coact with the jaw 13 of the axle housing 1 to form the swivel joint. The projecting member 30 is secured to the lower flange 29ª of the bearing axle at 31 and coacts with the lower jaw 13 of the axle housing 1 to form the swivel joint. The pinion shaft 20 at its upper end is supported in the bearings 32 mounted in the projecting member 29 of the load bearing axle and at its lower end in the bearings 33 mounted in the projecting member 30 carried on the load bearing axle flange 29ª.

The wheel driving axle 34 has the gear 35 thereon and turns in the bushing 36 inserted in the bearing axle 27; at its outer end the driving axle is squared to receive the wide flange 37 formed on the wheel cap 38 secured in place on the wheel by the screws 39. This wheel cap is a locking disk which transmits the power from the driving axle to the wheel and so creates locomotion. The wheel is thereby driven around on the bearings 28 and the load thus falls eventually on the load bearing axle 27, the driving axle 34 being thereby entirely relieved of the load.

The projecting member 29 is reamed at 40 for the reception of the bearing member 41 on the shoulder of which are provided ball bearings 42 engaged from above by the swivel nut 43 threaded thereon and held securely in place by the screw 44. On this bearing the jaw 13 of the main axle housing exerts stress so that this combination of parts forming the swivel pin is load bearing. The lower swivel pin 45 is held securely against turning by the screw 46 and the swivel motion takes place by the turning of the lower projecting member 30 on pin 45 within the embrace of the jaw 13, and the turning of the upper projecting member 29 on pin 41, on the bearing 42, within the embrace of the upper portion of the jaw 13. The swiveling motion is imparted to the wheel by means of the arm 47 formed on the projection 29 appearing especially in Fig. 2. This arm is adapted to be connected with a similar arm formed on the other wheel of the pair so that the pair may move in unison.

Between the mentioned projecting members on the bearing axle is a housing construction 48, 23 carried on the lower projecting member 30, aiding also in providing bearing surfaces for the ball bearings 33 and for the hub 22 of the pinion 21. It will also be noted that the projecting member 29 carries the contact points 49 and 50 to engage the recess formed in the flange 51 on the web of the wheel.

The inner end 52 of the axle shaft 17 may be squared or grooved and the face of the bore of the differential gear 53 will be correspondingly prepared to receive this end of the axle shaft, which will permit the removal of the axle shaft by simply sliding it outwardly.

Assuming the parts to be assembled as appears in Fig. 1 the disassembling is effected by removing the screws 44 and 46 and then unscrewing the swivel pins 43 and 45; the wheel including the axle shaft 17 is then readily removed as a whole from the axle housing 1. Cap screws 39 are next removed and the nut retaining the wheel driving axle 34 in place is taken off, thereby freeing the load bearing axle and the associated parts from the wheel. Nuts 31 are now removed and this allows the members 29 and 29ª together with the axle 34 to be lifted from the housings 48 and 30; the latter are thereupon removed leaving the split housing 15 which separates and exposes the gears 18 and 19.

The assembling of the mechanism is done in the inverse order and nothing further need be pointed out in that matter.

The utilization of the full floating axle with the steering and driving mechanism described above provides the maximum of driving power with the minimum of radius of curvature required for manipulating the vehicle and adapts this style of vehicle perfectly to the cramped or limited conditions of service under which it is peculiarly fitted to operate.

The claims are:—

1. In an automobile vehicle having a continuous axle housing inclosing a differential construction and a divided axle-driving shaft, and a steering and driving wheel associated with said housing and an end of said axle-driving shaft, jaws formed on the end of said axle housing, a spacious hub in said wheel, a load bearing axle construction mounted in said hub and having an integral upper projection thereon, a lower projecting member secured on said load bearing axle construction, pins to swivel said projections upon said jaws, a vertical pinion shaft mounted entirely within said projections coaxially with said pins, a full floating axle mounted in said load bearing axle construction, having an annular gear thereon positioned entirely within said projections, a pinion on said pinion shaft adapted to mesh with said annular gear member, a pinion on said axle-driving shaft, a second pinion on said pinion shaft adapted to mesh with said axle-driving shaft pinion, a divided housing encircling said pinion shaft and inclosing said second pinion and said axle shaft pinion, and a second divided housing encircling said pinion shaft and inclosing the last mentioned housing and the first mentioned pinion thereon, whereby said wheel structure and said gearing mechanism and said end of said divided axle shaft are so associated that they become bodily removable from said axle housing upon the removal of said swivel pins.

2. In an automobile vehicle having a continuous axle housing inclosing a differential construction and a divided axle shaft, and a steering and driving wheel associated with said housing and an end of said divided axle shaft, jaws formed on the end of said axle housing, a spacious hub in said wheel, a load bearing axle construction mounted in said hub and having an integral upper projection thereon, a lower projecting member secured on said load bearing axle construction, pins to swivel said projections upon said jaws, a vertical pinion shaft mounted entirely within said projections coaxially with said pins, a full floating axle mounted in said load bearing axle construction having an annular gear thereon positioned entirely within said projections, a sleeved pinion at the upper end of said pinion shaft adapted to mesh with said annular gear, a pinion at the lower end of said pinion shaft, a pinion mounted on the end of the divided axle shaft adapted to mesh with said lower pinion, a divided housing encircling said pinion shaft inclosing said lower pinion and said axle shaft pinion and engaging said sleeved portion of said upper pinion, and a second divided housing encircling said pinion shaft and inclosing said last mentioned housing and engaging said sleeved portion of said upper pinion and inclosing said upper pinion, whereby upon the removal of said swivel pins the entire structure mentioned herein is removable from said axle housing, and upon the subsequent release of the lower projection mentioned and the release of the floating axle mentioned the entire actuating mechanism above mentioned becomes exposed to the operator.

3. In an automobile driving and steering wheel construction comprising projecting members mounted on said wheel and a full floating axle construction operatively connected with an annular gear within said projecting members, one of said projecting members being removably secured on said wheel, a pinion shaft entirely included within said projecting members, a sleeved pinion on the upper end of said pinion shaft to mesh with said annular gear, a second pinion mounted at the lower end of said pinion shaft, and an axle housing inclosing a divided axle shaft therein and having swivel connection with said projecting members, a pinion on said axle shaft adapted to mesh with said second pinion, a divided housing encircling said pinion shaft and inclosing said second pinion and said axle shaft pinion and engaging said sleeved portion of said upper pinion, a second divided housing inclosing said upper pinion, engaging said sleeved portion thereof and embracing said first mentioned divided housing and forming a thrust bearing for said pinion shaft at its lower end, said housings and the pinions included therein being mounted entirely within the said projecting members and along with said divided shaft being removable bodily with said wheel upon the detachment of the latter from the axle housing.

In testimony whereof we affix our signatures in the presence of two witnesses.

CHARLES C. MARTIN.
JAMES H. COTTON

Witnesses:
A. D. BOOTH,
ROY C. PFEIL.